UNITED STATES PATENT OFFICE.

WILLIAM W. PATTERSON, OF CORNING, IOWA, ASSIGNOR OF ONE-HALF TO W. H. HOXIE, OF SAME PLACE.

ARTIFICIAL-STONE COMPOSITION.

SPECIFICATION forming part of Letters Patent No. 254,365, dated February 28, 1882.

Application filed November 16, 1881. (No specimens.)

*To all whom it may concern:*

Be it known that I, WILLIAM W. PATTERSON, a citizen of the United States, residing at Corning, in the county of Adams and State of Iowa, have invented certain new and useful Improvements in Artificial-Stone Composition; and I do hereby declare the following to be a full, clear, and exact description of the invention, such as will enable others skilled in the art to which it appertains to make and use the same.

Heretofore artificial stone has been made by combining together Portland cement, sand, slaked lime, and various chemical substances; but owing to the fact that such stone has been deficient in adhesive properties it has been found to crumble or become disintegrated after having been exposed to the action of the elements for any considerable period of time.

The object of my invention is to provide for the manufacture of artificial stone which shall be free from the objections to those now in use, owing to the use of new ingredients and a novel combination of them with old ones.

In carrying my invention into effect I take one part, in bulk, of Portland cement, one part of what is termed "Milwaukee" cement, and one part of unslaked lime which has been reduced to a powder or to small particles, and thoroughly mix them in a dry state. To one part of the above-described compound I add five parts, by bulk, of clean dry sand, which mixture forms the base of my stone.

In providing a binder for the compound above described I use soft water, to every thirty (30) gallons of which there is added two (2) pounds of common salt, one (1) pound of saltpeter, one (1) pound of any alkaline substance, and one-half (½) pound of carbonate of ammonia. This latter compound, when mixed with the two kinds of cement, produces sufficient chemical action upon the mass to cause it, when suitably tamped or pressed into molds, to be converted into a solid stone, capable of withstanding the action of the elements for an indefinite period of time. After the different kinds of cement, the lime, and the sand have been thoroughly mixed, as above described, I take, say, one quart of the liquid compound and add to it twelve (12) quarts of water, or about in that proportion for greater quantities, with which I proceed to wet the compound of cement, lime, and sand, using so much of the liquid as is necessary to properly prepare the first mixture for being tamped or pressed into molds of the size and form that it is desirable to have the stone assume when completed.

Experience has taught me that when the two kinds of cement named are used together, or when the Milwaukee cement is used with any of the other forms of similar cement, the effect is very different from what it is when only one of the other kinds are used, the rationale of which I am not able at this time to give, but am compelled to content myself with stating the fact.

I wish it understood that I do not confine myself to the particular proportions of ingredients used, as it is evident that they may be varied to some extent without departing from the spirit of my invention. The proportions named have, however, been found to produce satisfactory results.

Having thus fully described my invention, what I claim, and desire to secure by Letters Patent, is—

A composition to be formed into artificial stone, consisting of Milwaukee cement, Portland or other similar cement, unslaked lime in a dry and powdered state, and sand, and then adding thereto a solution made by combining soft water, salt, saltpeter, an alkali, and carbonate of ammonia, the proportions of ingredients used being substantially such as are hereinbefore described.

In testimony whereof I affix my signature in presence of two witnesses.

WILLIAM W. PATTERSON.

Witnesses:
E. O. MITCHELL,
ED. COPLAND.